UNITED STATES PATENT OFFICE.

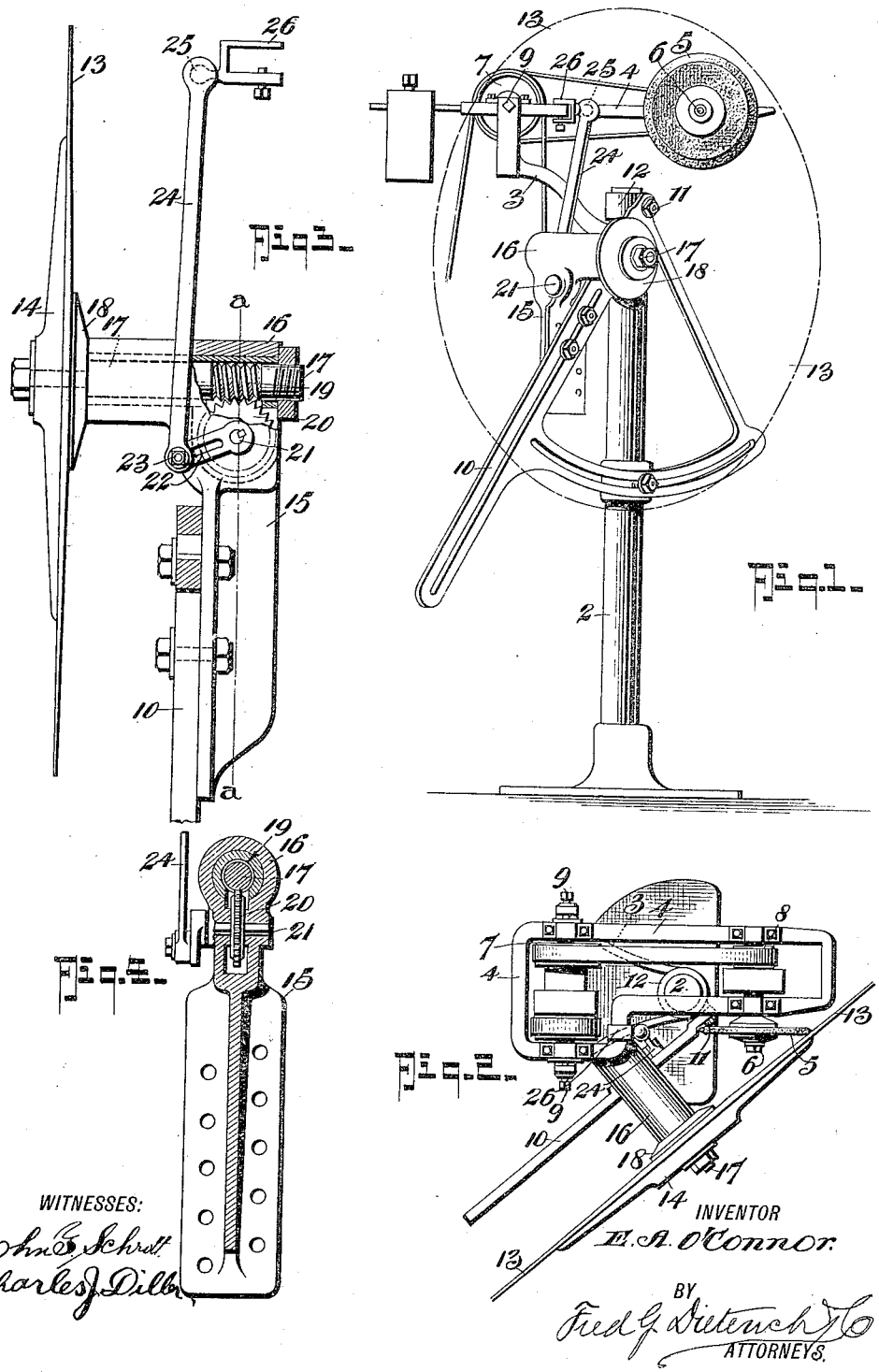

EDMUND A. O'CONNOR, OF VANCOUVER, BRITISH COLUMBIA, CANADA, ASSIGNOR OF ONE-HALF TO SAMUEL S. HAYES, OF VANCOUVER, CANADA.

SAW-REGRINDING ATTACHMENT FOR SAW GUMMERS OR SHARPENERS.

1,144,721.  Specification of Letters Patent.  Patented June 29, 1915.

Application filed December 14, 1914. Serial No. 877,148.

*To all whom it may concern:*

Be it known that I, EDMUND A. O'CONNOR, a citizen of the Dominion of Canada, residing at Vancouver, in the Province of British Columbia, Canada, have invented certain new and useful Improvements in Saw-Regrinding Attachments for Saw Gummers or Sharpeners, of which the following is a specification.

This invention relates to an apparatus for enabling the emery wheel of a saw gumming machine to be applied to re-grind the face of a circular saw plate, such as is used for cutting shingles or for jointing. These saws, which are used on a soft grained wood, such as cedar, require to be very thin toward their circumference and to run at a high speed and to afford them the required strength for the high speed of rotation, the plate is thickened toward the hub. As the saw wears and its diameter is reduced, it has to be reground on its face to maintain the required thickness at the circumference. Saw plate re-grinders are manufactured but are relatively expensive machines and cannot be kept in any but the largest mills, while a "saw gummer" is a comparatively cheap tool and is in all shingle mills.

The device, which is the subject of this application, comprises a simple mechanism applicable to a saw gumming machine and enabling the emery wheel of the saw gummer to be applied to grind the face of the saw plate.

The invention is particularly described in the following specification, reference being made to the drawings by which it is accompanied, in which:

Figure 1 is a side elevation of a saw gummer showing the application of the saw re-grinding device thereto. Fig. 2 is a plan of the same. Fig. 3 is a side elevation of the saw re-grinding attachment which is the particular subject of this application, and Fig. 4, a cross section of the same on the line *a—a* in Fig. 3.

In these drawings 2 represents the frame column of a saw gummer, 3 the head bracket which carries the frame 4 in which is the grinding emery wheel 5, the shaft 6 of which is driven by a belt taking over pulleys 7 and 8 on the axis 9 of the pivot of the frame 4 and the axis of the shaft 6. A swinging frame 10, to which the saw plate carrying arbor is secured, is pivoted at 11 to a sleeve 12 mounted on the column 2 and having means for securing it at any desired adjustment.

The machine as described thus far, is what is in common use for saw gumming or tooth sharpening. The invention, which is the particular subject of this application, is designed to be applied to this machine to enable the work of saw re-grinding to be performed on the same machine.

The device comprises a bearing bracket 15 adapted for attachment to the back of the swinging arm 10 in lieu of the arbor which for gumming and tooth sharpening is commonly secured to the front face of that arm and is removed when the machine is to be used for re-grinding. This bracket 15 has a bearing 16 projecting at right angles from it toward the front, and in it is rotatably mounted a saw carrying arbor 17 having a flange or collar 18 against which the face of the saw to be ground is tightened by a nut on the end of the arbor. The other end of the arbor has a collar or nut to retain it in the bearing, and adjacent this end a screw thread 19 is cut in the arbor. In this thread 19 mesh the teeth of a worm wheel 20, the shaft 21 of which is rotatably mounted in a slot or chambering in the bearing bracket 15. On the other end of the worm wheel shaft 21 is secured a slotted crank arm 22 in the slot of which a crank pin 23 is adjustably secured in its distance from the center of the shaft. This pin 23 is connected by a rod 24 to a spherical pin 25 projecting from a clamp 26 having provision by which it may be secured at any convenient position of the radial grinding wheel frame 4. The pin 25 is spherical to permit the opposite angular movements of the frame 4 and the crank arm 22.

A shingle saw plate 13 is reversed on its hub 14 and is placed with the saw plate against the flange 18 of the arbor 17 against which it is secured by its nut. The revolving grinding wheel 5 is then brought in contact with the face of the saw plate, as shown in Fig. 2, and while grinding the face of the saw plate 13 slowly rotates it and the arbor 17 on which it is secured. The worm wheel 20 is slowly rotated by rotation of the arbor and by means of the crank arm 22 and connecting rod 24 raises and lowers the grinding wheel frame 4 so that the grinding wheel traverses up and down over a definite distance of the face of the saw plate while it rotates.

An important feature of this re-grinder lies in mounting the saw plate to be reground that it is free to rotate, and in applying the grinding wheel to the face of the plate in a manner that the friction of the grinding operation imposes a turning moment on the saw plate to slowly rotate it and supplementary to this is the means by which the rotation of the saw plate under the grinding action raises and lowers the pivotal frame on the end of which the grinding wheel is mounted.

In all re-grinders with which I am acquainted rotation of the saw plate or of the arbor on which it is mounted is effected by gearing, which may be desirable where an absolutely true plane is required but adds materially to the cost of the machine, while rotation of the saw plate by the turning moment of the grinding friction is found to be amply sufficient to effect the required object if suitably applied and the raising and lowering of the grinding wheel is a supplementary feature which may be effected in any other manner than is here set forth.

The slight curvature in the path of the emery wheel 5 due to the radial movement of the frame 4 in which it is mounted, is not found to be objectionable as the saw plate yields under the greater pressure due to this radial action, and maintains a sufficient even pressure at the grinding surface.

The device forms a cheap and simple attachment, that can be readily applied to a saw-gummer, and thus enables that machine to be used for the purpose of re-grinding as well as for gumming and sharpening the teeth.

Having now particularly described my invention, I hereby declare that what I claim as new and desire to be protected in by Letters Patent, is:

1. A saw re-grinding attachment for a saw-gummer, comprising the combination with such a machine, of a saw holding arbor rotatably mounted in an attachment to the frame of the saw-gummer, and means for raising and lowering the pivotal frame in which the grinding wheel of the gummer is mounted from rotation of the arbor on which the saw to be ground is secured.

2. In a saw regrinder, the combination with a saw holding arbor rotatably mounted in a suitable frame, of a grinding wheel secured on an arbor which is rotatable adjacent to the plate so that the edge of the grinding wheel may be applied to the face of a saw plate mounted on the saw arbor, and means for reciprocating the grinding wheel across the face of the saw plate by rotation of the saw plate under the friction of the grinding wheel on its face.

3. In a saw regrinder, the combination with a saw holding arbor rotatably mounted in a suitable frame, of a grinding wheel secured on an adjacent arbor which is rotatable so that the edge of the grinding wheel may be applied to the face of a saw plate that is mounted on the saw arbor, in a manner to impart rotation to the saw plate, and means for traversing the grinding wheel across the face of the saw plate.

4. A saw re-grinding attachment for a saw-gummer, comprising the combination with such a machine, of a bracket removably secured to the saw holding frame of the gummer, a saw holding arbor rotatably mounted in the bracket said arbor having a screw thread cut in it, a worm wheel rotatably mounted in the bracket the teeth of which wheel mesh with the thread of the arbor, a crank rotatable with the worm wheel, and means for connecting the crank to the pivotal frame in which the grinding wheel of the gummer is mounted.

5. A saw re-grinding attachment for a saw-gummer, comprising the combination with such a machine, of a bracket removably secured to the saw holding frame of the gummer, an arbor rotatably mounted in the bracket, said arbor having a screw thread cut in it adjacent one end, a worm wheel secured on a shaft which is rotatable in the bracket, the teeth of which wheel mesh with the thread of the arbor, a crank secured on the worm wheel shaft the pin of which crank is adjustable in its radial distance and a connecting rod between the crank pin and a pin attached to the grinding wheel frame of the gummer.

In testimony whereof I affix my signature in presence of two witnesses.

EDMUND A. O'CONNOR.

Witnesses:
 ROWLAND BRITTAIN,
 SAMUEL S. HAYES.

Copies of this patent may be obtained for five cents each, by addressing the "Commissioner of Patents, Washington, D. C."